(12) United States Patent
Matsui et al.

(10) Patent No.: US 6,421,157 B1
(45) Date of Patent: Jul. 16, 2002

(54) OPTICAL DEFLECTION APPARATUS, PRODUCTION METHOD AND ADHERING METHOD THEREOF

(75) Inventors: Susumu Matsui; Satoshi Shibuya; Hiroshi Kobayashi; Naoji Kamimura, all of Hachioji (JP)

(73) Assignee: Konica Corporation (JP)

( * ) Notice: Subject to any disclaimer, the term of this patent is extended or adjusted under 35 U.S.C. 154(b) by 15 days.

(21) Appl. No.: 09/663,254

(22) Filed: Sep. 15, 2000

(30) Foreign Application Priority Data

Sep. 17, 1999 (JP) .......................................... 11-263593

(51) Int. Cl.⁷ .............................................. G02B 26/08
(52) U.S. Cl. ...................... 359/200; 359/198; 359/216; 359/217
(58) Field of Search ................................ 359/198–200, 359/216–219, 900; 310/90, 90.5

(56) References Cited

U.S. PATENT DOCUMENTS 5,946,122 A * 8/1999 Itoh et al. .................... 359/200
5,963,353 A * 10/1999 Shibuya et al. ............. 359/198

* cited by examiner

*Primary Examiner*—James Phan
(74) *Attorney, Agent, or Firm*—Bierman, Muserlian and Lucas

(57) ABSTRACT

An optical deflection apparatus includes: a base member; a coil fixed to the base member; and a rotor unit rotatable to the base member, having a bearing member, a rotating body provided on the bearing member, having reflection surfaces, and a magnet provided on the rotating body in a position facing the coil. Either the magnet and the rotating body or the bearing member and the rotating body are adhered together by an adhesive agent whose Young's modulus after hardening is not more than 100 N/mm².

24 Claims, 3 Drawing Sheets

MAIN SCANNING DIRECTION

SUB-SCANNING DIRECTION

OPTICAL DEFLECTION APPARATUS, PRODUCTION METHOD AND ADHERING METHOD THEREOF

BACKGROUND OF THE INVENTION

The present invention relates to an optical deflection apparatus by which a rotational polygon mirror is rotated, and the light beam scanning is conducted, and to a production method of the optical deflection apparatus and an adhering method which is appropriately used for the production method.

Conventionally, in an electro-photographic system image forming apparatus such as a laser beam printer or a digital copier, an optical deflection apparatus which conducts light beam scanning for writing an image on a photoreceptor drum is used. In such the optical deflection apparatus, an optical deflection apparatus in which a polygon mirror in which a magnet is fixed, is rotatably provided through a bearing, and a coil is provided on the substrate in opposite to the magnet, is widely known (for example, refer to Japanese Tokkaihei No. 8-121471).

However, when the magnet is fixed on a polygon rotor unit by an adhesive agent, there is a problem in which the strain is generated in each part when the temperature variation is generated, and the flatness of the mirror is lacked. Further, a change is generated in the strain by this temperature variation, and the variation is also caused in the balance of the polygon mirror, and when the change of the balance becomes large, the vibration is increased, and as the result, there is a possibility of the deterioration of the image quality of the image forming apparatus or a noise problem. Further, when the temperature variation is generated, there is a problem that the strength of the joint portion by the adhesive agent is easily decreased. Further, as the adhesive agent, when anaerobic adhesive agent is used together with the hardening accelerator including amine organic compound, according to circumstances, there is a problem that a joint portion by the adhesive agent is easily peeled off, and the joint strength is decreased.

SUMMARY OF THE INVENTION

In view of the foregoing problems, the object of the present invention is to provide an optical deflection apparatus which can improve the mirror flatness and the balance characteristics of the polygon mirror even when temperature variation is caused.

Further, the object of the present invention is to provide the optical deflection apparatus, and its production method and the adhering method thereof, in which, even when the temperature variation is caused, the joint strength of the joint portion in which each part of the optical deflection apparatus is jointed by the adhesive agent, can be prevented from being decreased, and disadvantages in which the joint portion by the adhesive agent is easily peeled off, are prevented, and the decrease of the joint strength can be prevented.

In order to attain the above objects, the present inventors diligently investigate and find the following: when the temperature variation is caused in the optical deflection apparatus, a strain is generated due to the differential thermal expansion of each part, and the flatness of the mirror, the balance and joint strength are badly affected, and therefore, when each part is adhered by the adhesive agent, by using the adhesive agent whose Young's modulus after hardening is not more than 100 N/mm$^2$, the strain of each portion due to the temperature variation can be effectively absorbed, and further, the difference of the thermal expansion coefficients between the adhesive agent and each part is considered, and the following is found: when the temperature is specifically risen, it is effective that the gap of each member is filled up by the expansion of the adhesive agent, thereby, the present invention is attained.

Further, in the case where the acrylic anaerobic adhesive agent is used together with the hardening accelerator as the adhesive agent, it is found that: when the ultraviolet ray is irradiated onto the coating surface of the hardening accelerator, corresponding to the accumulated irradiation quantity, the deterioration of the component of the hardening accelerator occurs, and the adhesive agent is not hardened, and due to this, the joint portion by the adhesive agent easily peels off, and from the result, the present invention is attained.

That is, the optical deflection apparatus is characterized in that: it comprises a base member, a coil fixed to the base member, and a rotor unit which rotates to the base member, and the rotor unit has: a rotating body having the polygon mirror; a bearing portion provided on the rotating body; and a magnet fixed on the rotating body in opposite to the coil, wherein the magnet and the rotating body are jointed together by the adhesive agent whose Young's modulus after hardening is not more than 100 N/mm$^2$.

According to this optical deflection apparatus, because the adhesive agent whose Young's modulus after hardening is not more than 100 N/mm$^2$, is used, the joint portion of the magnet with the rotating body has the flexibility and is easily deformed, therefore, even when the temperature variation occurs, the strain due to the differential thermal expansion between the magnet and the rotating body having the polygon mirror can be absorbed by the deformation of the adhesive agent. Accordingly, the flatness of the mirror of the polygon mirror can be improved, and further, the change of the balance characteristic is small. Further, the strength of the joint portion by the adhesive agent can be prevented from being decreased due to the temperature variation.

Another optical deflection apparatus of the present invention is characterized in that: it comprises a base member, a coil fixed to the base member, and a rotor unit which rotates to the base member, and the rotor unit has: a rotating body having the polygon mirror; a bearing portion provided on the rotating body; and a magnet fixed on the rotating body in opposite to the coil, wherein the thermal expansion coefficient of the rotating body is not smaller than the thermal expansion coefficient of the magnet, and the magnet and the rotating body are jointed by the adhesive agent whose thermal expansion coefficient after hardening is not smaller than the thermal expansion coefficient of the rotating body.

According to this optical deflection apparatus, even when the thermal expansion coefficient of the adhesive agent is maximum, and the gap is generated between the magnet and rotating body at the time of high temperature, it can be filled up by the expansion of the adhesive agent. Therefore, the joint strength of the adhesive agent at the time of the temperature variation and specifically at the time of high temperature, can be prevented from being lowered.

In this case, when the Young's modulus after the hardening of the adhesive agent is not more than 100 N/mm$^2$, as described above, even when the temperature variation occurs, the strain due to the differential thermal expansion between the magnet and the rotating body with the polygon mirror is absorbed by the deformation of the adhesive agent, therefore, the flatness of the mirror of the polygon mirror can be improved, and further, the change of the balance characteristic is small. Further, the strength of the joint portion of the adhesive agent can be prevented from being lowered due to the temperature variation.

Further, yet another optical deflection apparatus of the present invention is characterized in that: it has a base member, a coil fixed to the base member, and a rotor unit which rotates to the base member, and the rotor unit has: a rotating body having the polygon mirror; a bearing provided on the rotating body; and a magnet fixed on the rotating body in opposite to the coil, wherein the bearing and the rotating body are jointed together by the adhesive agent whose Young' modulus after hardening is not more than 100 N/mm$^2$.

According to the optical deflection apparatus, as described above, even when the temperature variation occurs, because the strain due to the differential thermal expansion between the bearing and the rotating body with the polygon mirror is absorbed by the deformation of the adhesive agent, the flatness of the polygon mirror can be improved, and further, the change of the balance characteristic is small. Further, the strength of the joint portion of the adhesive agent can be prevented from being lowered due to the temperature variation.

Furthermore, further yet another optical deflection apparatus of the present invention is characterized in that: it has a base member, a coil fixed to the base member, and a rotor unit which rotates to the base member, and the rotor unit has: a rotating body having the polygon mirror; a bearing provided on the rotating body; and a magnet fixed on the rotating body in opposite to the coil, wherein the thermal expansion coefficient of the rotating body is not smaller than the thermal expansion coefficient of the bearing, and the bearing and the rotating body are jointed together by the adhesive agent whose thermal expansion coefficient after hardening is not smaller than the thermal expansion coefficient of the rotating body.

According to this optical deflection apparatus, even when the thermal expansion coefficient of the adhesive agent is the maximum, and the gap is generated at the time of high temperature between the bearing and the rotating body, the gap can be filled up by the expansion of the adhesive agent. Therefore, the joint strength of the adhesive agent at the time of the temperature variation, specifically at the time of high temperature, can be prevented from being lowered.

In this case, because the Young's modulus of the adhesive agent after hardening is not more than 100 N/mm$^2$, as described above, even when the temperature variation occurs, the strain due to the differential thermal expansion between the bearing and the rotating body with the polygon mirror is absorbed by the deformation of the adhesive agent, thereby, the flatness of the mirror of the polygon mirror can be improved, further, the change of the balance characteristic is small. Further, the strength of the joint portion of the adhesive agent can be prevented from being lowered due to the temperature variation.

Further, in addition to that the bearing and the rotating body are jointed together by the adhesive agent whose Young's modulus after hardening is not more than 100 N/mm$^2$, when the magnet and the rotating body are jointed together by the adhesive agent whose Young's modulus after hardening is not more than 100 N/mm$^2$, the flatness of the mirror of the polygon mirror is further improved, and further, the change of the balance characteristic is small. Further, the strength of the joint portion of the adhesive agent can be more prevented from being lowered due to the temperature variation.

Further, in addition to that the bearing and the rotating body are jointed together by the adhesive agent whose thermal expansion coefficient after hardening is not smaller than the thermal expansion coefficient of the rotating body, the magnet and the rotating body are jointed together by the adhesive agent whose thermal expansion coefficient after hardening is not smaller than the thermal expansion coefficient of the rotating body, thereby, the joint strength of the adhesive agent at the time of the temperature variation, specifically at the time of high temperature, can be more prevented from being lowered.

In this case, when the Young's modulus after hardening of the adhesive agent to joint the bearing and the rotating body, and the magnet and the rotating body, is not more than 100 N/mm$^2$ for both cases, the flatness of the mirror of the polygon mirror can be further improved, and further, the balance characteristic is not changed. Further, the strength of the joint portion of the adhesive agent can be more prevented from being lowered due to the temperature variation.

A production method of the optical deflection apparatus of the present invention which is a production method of the optical deflection apparatus having, a base member, a coil fixed to the base member, and a rotor unit which rotates to the base member, and the rotor unit has: a rotating body having the polygon mirror; a bearing provided on the rotating body; and a magnet adhered to the rotating body in opposite to the coil, and it is characterized in that: as the adhesive agent for the magnet, the anaerobic adhesive agent is used together with a hardening accelerator including amine organic compound, and when the surface on which the anaerobic adhesive agent is coated, and the surface on which the hardening accelerator is coated, are adhered together, the accumulated irradiation quantity of the light ray of the wavelength of not more than 400 nm on the surface on which the hardening accelerator is coated, is limited to not more than 1500 mJ/cm$^2$, and preferably, to not more than 1000 mJ/cm$^2$.

According to this production method, it can be effectively prevented that, when the ultraviolet ray (the light ray of the wavelength of not more than 400 nm) is irradiated on the coated surface of the hardening accelerator, the deterioration of the component of the hardening accelerator occurs and the adhesive agent is not hardened, and the magnet jointed by the adhesive agent is not easily peeled off, and the joint strength by the adhesive agent of the magnet of the optical deflection apparatus can be prevented from being lowered. Further, peeling off of the joint portion in the production or scattering of the not-hardened adhesive agent can be prevented, and the increase of the yield of the optical deflection apparatus and the quality, can be realized. Incidentally, the production method can be applied without specifically limiting the kind of the anaerobic adhesive agent, the Young's modulus after hardening, and the thermal expansion coefficient.

Further, the adhering method of the present invention is an adhering method by which both surfaces are jointed together by using the anaerobic adhesive agent together with the hardening accelerator, which is characterized in that: when the surface on which the anaerobic adhesive agent is coated, and another surface on which the hardening accelerator is coated, are jointed together, the accumulated irradiation quantity of the light ray of the wavelength of not more than 400 nm on the coated surface of the hardening accelerator is limited to not more than 1500 mJ/cm$^2$, preferably, to not more than 1000 mJ/cm$^2$.

According to this adhering method, it can be effectively prevented that, when the ultraviolet ray (the light ray of the wavelength of not more than 400 nm) is irradiated on the coated surface of the hardening accelerator, the deterioration of the component of the hardening accelerator occurs and the adhesive agent is not hardened, and the jointed portion by the adhesive agent is. not easily peeled off, and the strength of the jointed portion by the adhesive agent can be prevented from being lowered. Further, peeling off of the joint portion by the adhesive agent or scattering of the not-hardened adhesive agent can be prevented, and the increase of the yield of the jointed portion in the production by the adhesive agent and the quality, can be realized.

Incidentally, in the present invention, the anaerobic adhesive agent is an adhesive agent in which, when it is in contact with the air, it is stable and does not react, and is not hardened, but, when the air is shut off, and it is in contact with the metal, it reacts and the hardening is started and advanced, and there is, for example, an acrylic anaerobic adhesive agent. Further, the hardening accelerator includes the metal, and thereby, the metal is made up for the start and advance of the hardening reaction.

DETAILED DESCRIPTION OF THE PREFERRED EMBODIMENT

Figure 1:
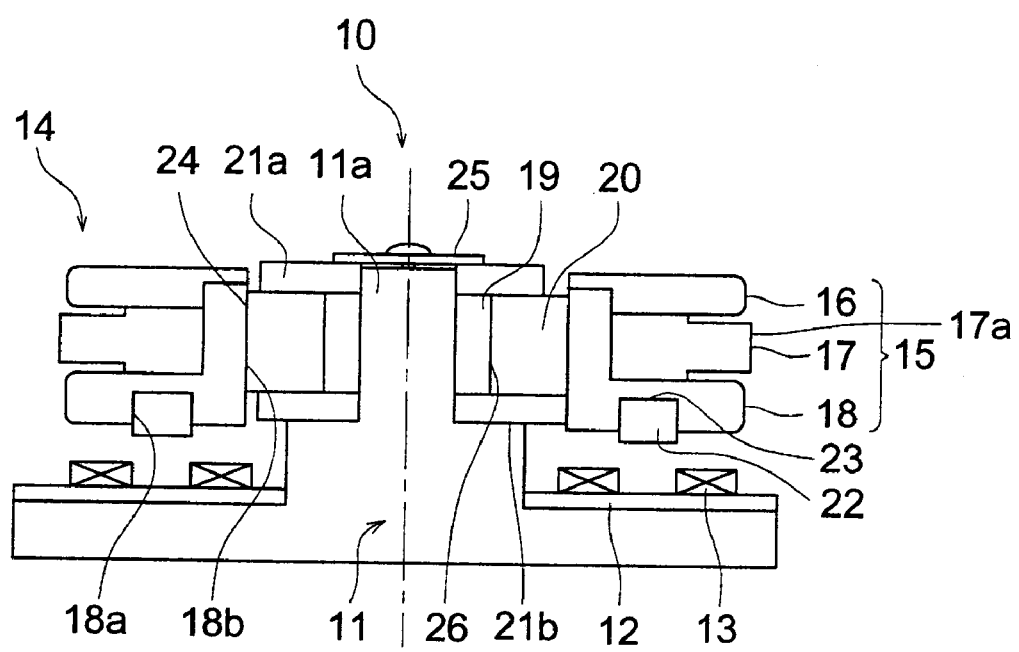
FIG. 1 is a sectional view of the first optical deflection apparatus showing the first embodiment of the present invention.

Referring to the drawings, the first embodiment (optical deflection apparatus)and the second embodiment (adhering method) will be described below.

(First Embodiment)

Figure 2:
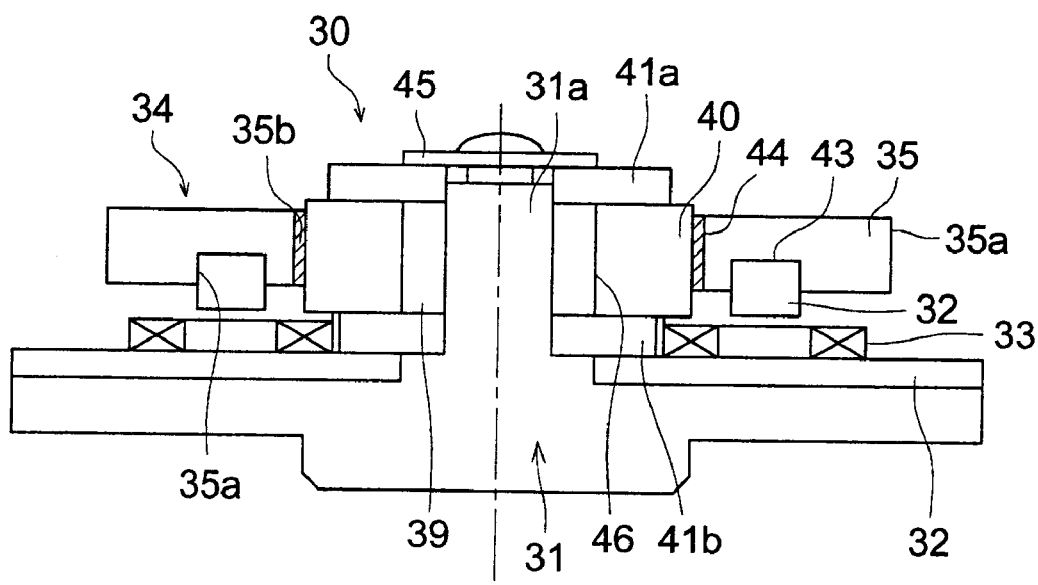
FIG. 2 is a sectional view of the second optical deflection apparatus showing the first embodiment of the present invention.

FIG. 1 is a sectional view of the first optical deflection apparatus showing the first embodiment of the present invention, and FIG. 2 is a sectional view of the second optical deflection apparatus.

The first optical deflection apparatus 10 in FIG. 1 has a base plate 11 as the base member, a coil 13 formed and fixed on the printed circuit board 12 of the base plate 11, and a rotor unit 14 rotating opposed to the base plate 11. The rotor unit 14 is provided with: a rotating body 15 having a polygon mirror 17 on which the mirror surface 17a is formed, a suppressing plate 16 of the polygon mirror 17 and a flange 18 to fix the polygon mirror 17; a bearing 20 provided on the inner peripheral surface 18b of the flange 18; and a magnet 22 inserted and fixed in the concave portion 18a of the flange 18 in opposite to the coil 13, and these are integrally rotated.

The magnet 22 is inserted into the concave portion 18a of the flange 18 and fixed through the adhesive agent layer 23. Further, the bearing 20 is fixed on the inner peripheral surface 18b of the flange 18 through the adhesive agent layer 24. The adhesive agent layers 23 and 24 are formed of the adhesive agent whose Young's modulus after hardening is not more than 100 N/mm², and the thermal expansion coefficient of the adhesive agent is not smaller than the thermal expansion coefficient of the flange 18. Further, the thermal expansion coefficient of the flange 18 is not smaller than the thermal expansion coefficient of the magnet 22 and the bearing 20.

Further, a lower thrust bearing 21b is fixed on the lower portion of a central axis 11a of the base plate 11, and a bearing 19 is fixed around the central axis 11a, and further, the upper thrust bearing 21a is fixed on the upper portion of the central axis 11a by the fixed plate 25 by using screws. The concave portion 26 is formed of the upper thrust bearing 21a, the lower thrust bearing 21b and the bearing 19. A bearing 20 fixed through the adhesive agent layer 24 on the flange 18 is positioned in the concave portion 26 through a gap, and in the case where it is rotated together with the rotating body 15 by the interaction with the magnet 22 when the current flows to the coil 13, it can be rotated at the high speed while forming the air gap toward the concave portion 26.

Next, the second optical deflection apparatus in FIG. 2 will be described. This optical deflection apparatus 30 has a base plate 31 as the base member, a coil 33 formed and fixed on the printed circuit board 32 of the base plate 31, and a rotor unit 34 rotating opposed to the base plate 31. The rotor unit 34 is, deferent from the case in FIG. 1, the flange and the mirror suppressing plate being omitted, provided with: a polygon mirror 35 as the rotating body on which the mirror surface 35a is formed; a magnet 32 inserted and fixed in the concave portion 35a of the lower surface in opposite to the coil 13; and a bearing 40 provided on the inner peripheral surface 35b of the polygon mirror 35, and these are integrally rotated.

The magnet 32 is inserted into the concave portion 35a and fixed through an adhesive agent layer 43. Further, the bearing 40 is fixed on the inner peripheral surface 35b of the polygon mirror 35 through the adhesive agent layer 44. The adhesive layers 43 and 44 are formed of the adhesive agent whose Young's modulus after hardening is not more than 100 N/mm², and the thermal expansion coefficient of the adhesive agent is not smaller than the thermal expansion coefficient of the polygon mirror 35. Further, the thermal expansion coefficient of the polygon mirror 35 is not smaller than the thermal expansion coefficient of the magnet 32 and the bearing 40.

Further, a lower thrust bearing 41b is fixed on the lower portion of a central axis 31a of the base plate 31, and a bearing 39 is fixed around the central axis 31a, and further, the upper thrust bearing 41a is fixed on the upper portion of the central axis 31a by the fixed plate 45 by using screws. The concave portion 46 is formed of the upper thrust bearing 41a, the lower thrust bearing 41b and the bearing 39. A bearing 40 fixed through the adhesive agent layer 44 on the polygon mirror 35 is positioned in the concave portion 46 through a gap, and in the case where it is rotated together with the polygon mirror 35 by the interaction with the magnet 32 when the current flows to the coil 33, it can be rotated at the high speed while forming the air gap toward the concave portion 46.

In the above-described optical deflection apparatus, when the adhesive agent whose Young's modulus after hardening is not more than 100 N/mm² is used, the joint portion of the adhesive agent of the magnets 22 and 32, with the rotating body 15 and the polygon mirror 35, and the joint portion of the adhesive agent of the rotating body 15 and the polygon mirror 35, with the bearings 20 and 40, are flexible and easily deformable, therefore, the strain of each portion due to the temperature variation can be effectively absorbed, and even when the temperature variation occurs, the strain due to the differential thermal expansion is absorbed by the deformation of the adhesive agent. Accordingly, the mirror flatness of the polygon mirror can be improved, and further, the balance characteristic does not change. Further, considering the difference of the thermal expansion coefficient between the adhesive agent and each part, when the temperature specifically rises, because the gap of each member is filled up by the expansion of the adhesive agent, the strength of the joint portion of the adhesive agent can be prevented from being lowered due to the temperature variation.

Figure 3:
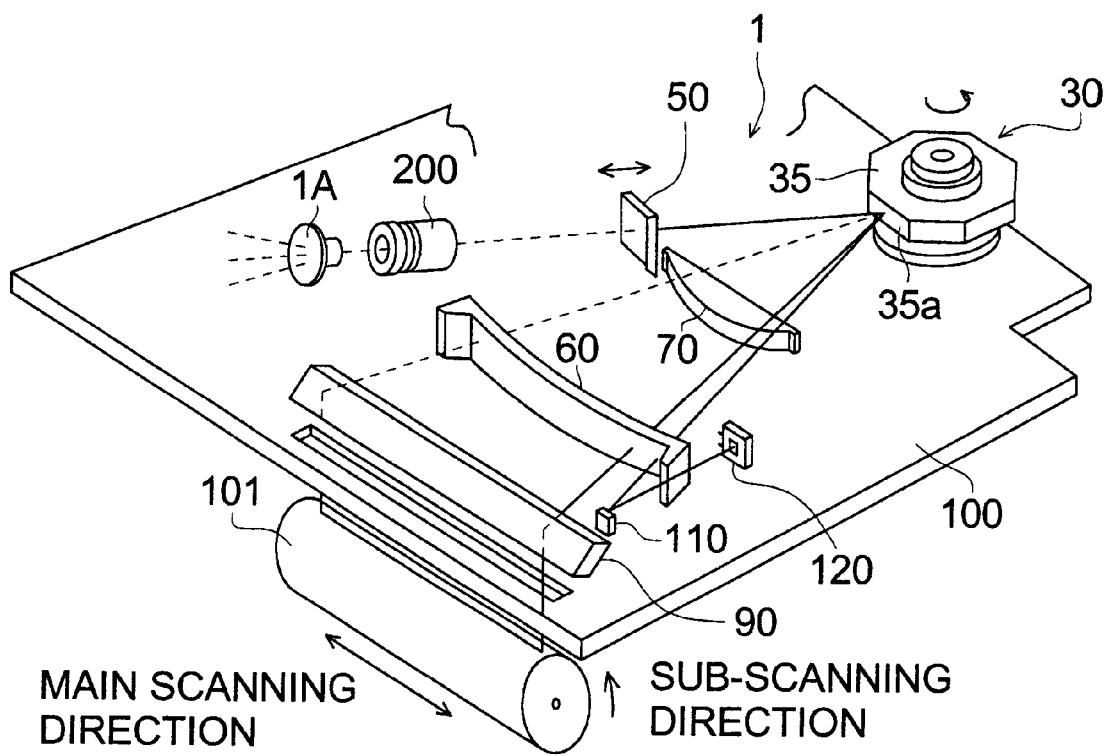
FIG. 3 is a perspective view showing a main portion of an optical scanning optical unit of an image forming apparatus in which the optical deflection apparatus of FIG. 2 is arranged.

Next, referring to FIG. 3, an example in which the optical deflection apparatus is assembled in the optical scanning optical unit of the image forming apparatus, will be described. This optical scanning optical unit is provided with each of: the optical deflection apparatus 30 in FIG. 2 which is fixed on a base plate 100 and has the polygon mirror 35; a semiconductor laser light emitting body 1A; a collimator lens (beam shaping optical system) 200; the first cylindrical lens 50; an fθ lens 70; the second cylindrical lens 60; a reflection mirror 90; a mirror for the timing detection 110; and synchronization detector 120. A beam emitted from the semiconductor laser light emitting body 1A is converted into the parallel light by the collimator lens 200, and enters into the polygon mirror 35 through the first cylindrical lens 50 of the first image forming optical system. The reflected light passes through the second image forming optical system composed of the fθ lens 70, and the second cylindrical lens 60, and through the reflection mirror 90, scans on the peripheral surface of a photoreceptor drum 101 of the image forming apparatus with a predetermined spot diameter in the primary scanning direction. The synchronization detection for each line is conducted in such a manner that the light flux before the scanning is entered into the synchronization detector 120 through a mirror 110, and the photoreceptor drum 101 is rotated in the subsidiary scanning direction in timed relationship with this.

In the manner as described above, the image can be written on the photoreceptor drum 101, and in this case, in the mirror surface 35a of the polygon mirror 35 of the optical deflection apparatus, the mirror flatness is good even when the temperature in the apparatus varies, and the balance characteristic does not change, and there is no possibility that the vibration is generated, thereby, the possibility of the deterioration of the image quality and the noise problem at the temperature variation in the image forming apparatus can be prevented.

EXAMPLE

Next, the above optical deflection apparatus 10 and 30 are actually made as Examples 1, 2, and 3 by using the adhesive agents as shown in Table 1, and these examples are evaluated by setting 4 items, which will be described later.

TABLE 1

| Adhesive agent | Product Name (maker) | Young's modulus (N/mm²) | Thermal expansion coefficient (X 10⁻⁵) |
|---|---|---|---|
| A | Super X (Cemedine) | 20 | 14 |
| B | TB3056B (ThreeBond) | 98 | 5 |
| C | TB3062 (ThreeBond) | 220 | 13 |
| D | TB3103 (ThreeBond) | 1000 | 12 |
| E | L/T3851 (Loctite) | 2210 | 10 |
| F | TB3732 (ThreeBond) | >5000 | 0.75 |

Further, the magnets 22 and 23 are made of neodymium·iron·boric material, and its thermal expansion coefficient is $-0.08 \times 10^{-5}$, and the bearings 20 and 40 are made of alumina ceramic material, and its thermal expansion coefficient is $0.78 \times 10^{-5}$, and further, the rotating body (flange 18, polygon mirrors 17 and 35, suppressing plate 16) is made of aluminum, and its thermal expansion coefficient is $2.7 \times 10^{-5}$.

The produced optical deflection apparatus is evaluated by the following 4 items:

(1) Mirror flatness
(2) Temperature change of the balance characteristic
(3) Heat cycle joint strength lowering characteristic
(4) The adhering strength lowering characteristic at high temperature (1) The mirror flatness is evaluated by measuring the irregularity of the mirror surfaces 17a and 35a by the laser interference meter (the wavelength $\lambda = 633$ nm). (2) The temperature change of the balance characteristic is evaluated by the difference of the balances measured at 25° C. and 75° C. (3) Heat cycle joint strength lowering characteristic is evaluated in such a manner that, after repeating the temperature change from 0° C. to 75° C. by 500 cycles, the joint strength is measured at 25° C. (4) The adhering strength lowering characteristic at high temperature is evaluated in such a manner that the ratio of the joint strength at 75° C. to the joint strength at 25° C. is defined as the strength lowering rate. The evaluation criterion of (1) to (4) is as shown in Table 2, which will be described later.

(Example 1)

The adhesive agent layers 23 and 24 of the magnets 22 and 23 in the optical deflection apparatus 10 and 30 in FIG. 1 and FIG. 2, are formed by using the adhesive agents A, B, C, D, E and F, in Table 1, and in order to evaluate the joint portions of the adhesive agents of the magnets 22 and 32, the optical deflection apparatus 10 in FIG. 1 is defined as the structure (1), and the temperature change of the balance characteristic, the heat cycle joint strength lowering characteristic, and the adhering strength lowering characteristic at high temperature of the apparatus in which the bearing 20 and the flange 18 are fixed by shrink fitting, are evaluated, and further, the optical deflection apparatus 30 in FIG. 2 is defined as the structure (2), and the mirror flatness of the apparatus having no central axis portion (bearing 20, etc.) is evaluated. These evaluation results are shown in Table 2.

TABLE 2

Example 1

| Adhesive agent | Young's modulus N/mm$^2$ | Thermal expansion coefficient × 10$^{-5}$ | Mirror flatness | Temperature change of balance characteristic | Heat cycle joint strength lowering | Adhering strength lowering at high temperature |
|---|---|---|---|---|---|---|
| A (Super X) | ◯: 20 | ◯: 14 (*) | ◎ | ◎ | ◎ | ◯ |
| B (TB3056B) | ◯: 98 | ◯: 5 (*) | ◯ | ◯ | ◯ | ◯ |
| C (TB3062) | X: 220 | ◯: 13 (*) | X | ◯ | ◯ | ◯ |
| D (TB3103) | X: 1000 | ◯: 12 (*) | X | ◯ | Δ | ◯ |
| E (L/T3851) | X: 2210 | ◯: 10 (*) | X | ◯ | Δ | ◯ |
| F (TB3732) | X: >5000 | X: 0.75 (**) | X | X | X | X |

Note:
(*) (adhesive agent > rotating body > magnet)
(**) (rotating body > adhesive agent > magnet)

As can be seen from Table 2, when the magnet is jointed by the adhesive agents A and B whose Young's modulus is not more than 100 N/mm$^2$, the mirror flatness, the temperature change of the balance characteristic, and the heat cycle joint strength lowering characteristic are good, and specifically, in the case of the adhesive agent A whose Young's modulus after hardening is 20 N/mm$^2$, it is vary good. Further, like as the adhesive agents A, B, C, D, and E, when the thermal expansion coefficient of the adhesive agent to joint the magnet is not smaller than the thermal expansion coefficient of the rotating body, the adhesive strength lowering characteristic at high temperature is good. Further, in the adhesive agent F, the thermal expansion coefficient is not larger than that of the rotating body, and the Young's modulus is not smaller than 100 N/mm$^2$, and any one of evaluation items is under the practical limit.

(Example 2)

Next, as Example 2, the adhesive agent layers 24 and 44 in FIG. 1 and FIG. 2 are formed by using the same adhesive agents A, B, C, D, E and F in Example 1, and in order to evaluate the joint portions of the adhesive agent layers 24 and 44, in the structure (1), the apparatus in which the magnet 22 is adhered by the adhesive agent A, is evaluated for the temperature change of the balance characteristic, the heat cycle joint strength lowering characteristic, and the adhering strength lowering characteristic at high temperature, and in the structure (2), the apparatus without the magnet is evaluated for the mirror flatness. These evaluation results are shown in Table 3.

As shown In Table 3, in the case of the adhesive agents A and B whose Young's modulus after hardening is not more than 100 N/mm$^2$, the mirror flatness, the temperature change of the balance characteristic and the heat cycle joint strength lowering characteristic are good, and specifically, in the case of the adhesive agent A whose Young's modulus after hardening is 20 N/mm$^2$, the mirror flatness and the heat cycle joint strength lowering characteristic are very good. Further, as in the case of the adhesive agents A, B, C, D, and E, when the thermal expansion coefficient of the adhesive agent to joint the rotating body is not smaller than the thermal expansion coefficient of the rotating body, the adhesive strength lowering characteristic at the high temperature is good. Further, in the adhesive agent F, the thermal expansion coefficient is larger in the order of rotating body, adhesive agent, and magnet, and the Young's modulus is not smaller than 100 N/mm$^2$, and any one of evaluation items is the practical limit or under that.

(Example 3)

Next, as Example 3, the adhesive agent layers 23, 24, 43 and 44 in FIG. 1 and FIG. 2 are formed by using the same adhesive agents A, B, C, D, E and F in Example 1, and in the structure (1), the temperature change of the balance characteristic, the heat cycle joint strength lowering characteristic, and the adhering strength lowering characteristic at high temperature, are evaluated, and in the structure (2), the mirror flatness is evaluated. These evaluation results are shown in Table 4.

TABLE 3

Example 2

| Adhesive agent | Young's modulus N/mm$^2$ | Thermal expansion coefficient × 10$^{-5}$ | Mirror flatness | Temperature change of balance characteristic | Heat cycle joint strength lowering | Adhering strength lowering at high temperature |
|---|---|---|---|---|---|---|
| A (Super X) | ◯: 20 | ◯: 14 (*) | ◎ | ◯ | ◎ | ◯ |
| B (TB3056B) | ◯: 98 | ◯: 5 (*) | ◯ | ◯ | ◯ | ◯ |
| C (TB3062) | X: 220 | ◯: 13 (*) | Δ | Δ | ◯ | ◯ |
| D (TB3103) | X: 1000 | ◯: 12 (*) | Δ | X | Δ | ◯ |
| E (L/T3851) | X: 2210 | ◯: 10 (*) | Δ | X | Δ | ◯ |
| F (TB3732) | X: >5000 | X: 0.75 (**) | Δ | Δ | Δ | X |

Note:
(*) (adhesive agent > rotating body > magnet)
(**) (rotating body > adhesive agent > magnet)

TABLE 4

Example 3

| Adhesive agent | Young's modulus N/mm² | Thermal expansion coefficient × 10⁻⁵ | Mirror flatness | Temperature change of balance characteristic | Heat cycle joint strength lowering magnet | Heat cycle joint strength lowering bearing | Adhering strength lowering at high temperature magnet | Adhering strength lowering at high temperature bearing |
|---|---|---|---|---|---|---|---|---|
| A (Super X) | ○: 20 | ○: 14 (*) | ◎ | ○ | ◎ | ◎ | ○ | ○ |
| B (TB3056B) | ○: 98 | ○: 5 (*) | ○ | ○ | ○ | ○ | ○ | ○ |
| C (TB3062) | X: 220 | ○: 13 (*) | X | Δ | ○ | ○ | ○ | ○ |
| D (TB3103) | X: 1000 | ○: 12 (*) | X | X | Δ | Δ | ○ | ○ |
| E (L/T3851) | X: 2210 | ○: 10 (*) | X | X | Δ | Δ | ○ | ○ |
| F (TB3732) | X: >5000 | X: 0.75 (**) | X | X | X | Δ | X | X |

Note:
(*) (adhesive agent > rotating body > magnet)
(**) (rotating body > adhesive agent > magnet)

As shown In Table 4, in the case of the adhesive agents A and B whose Young's modulus after hardening is not more than 100 N/mm², the mirror flatness, the temperature change of the balance characteristic and the heat cycle joint strength lowering characteristic are good, and specifically, in the case of the adhesive agent A whose Young's modulus after hardening is 20 N/mm², the mirror flatness and the heat cycle joint strength lowering characteristic are very good. Further, as in the case of the adhesive agents A, B, C, D, and E, when the thermal expansion coefficient of the adhesive agent to joint the magnet and the rotating body is not smaller than the thermal expansion coefficient of the rotating body, the adhesive strength lowering characteristic at the high temperature is good. Further, in the adhesive agent F, the thermal expansion coefficient is larger in the order of the rotating body, adhesive agent, and magnet, and the Young's modulus is not smaller than 100 N/mm², and almost all of evaluation items are under the practical limit.

(The Second Embodiment)

Next, an adhering method will be described as the second embodiment of the present invention. This adhering method is an adhering method in which, when the surface on which the anaerobic adhesive agent is coated, and the surface on which the hardening accelerator including an amine organic compound is coated, are adhered together, the irradiation quantity of the ultraviolet ray (the irradiation quantity of the light ray of the wavelength of not more than 400 nm) on the coated surface of the hardening accelerator is limited to not more than 1500 mJ/cm², preferably to not more than 1000 mJ/cm².

That is, when the accumulated irradiation quantity (irradiation quantity and irradiation time) of the ultraviolet ray onto the coated surface of the hardening accelerator including an amine organic compound is limited to the range in which the hardening accelerator is not deteriorated, the non-hardening on the adhered surfaces is effectively prevented. Specifically, when the surface on which the hardening accelerator is coated, is controlled, the intensity of the ultraviolet ray in the control circumstance is measured, and when the light ray of the daylight is limited by a light shielding means such as a curtain so that the intensity of the ultraviolet ray is not more than 1500 mJ/cm², preferably, not more than 1000 mJ/cm², or the exposure time is limited, this adhering method can be carried out.

According to this, there is no non-hardening portion in the adhesive agent, and for example, in the above optical deflection apparatus in FIG. 1 and FIG. 2, the peeling off of the magnet and scattering of the non-hardened adhesive agent, etc. can be prevented. Thereby, the increase of the yield and the quality of the products can be realized in the jointing process by the adhesive agent.

(Example)

As the acrylic anaerobic adhesive agent, the trade name "Loctite 334" is used, and as the hardening accelerator, the trade name "Loctite 7386" including the modified dihydropyridine of amine organic compound is used, and the acrylic anaerobic adhesive agent "Loctite 334" is coated on one of 2 aluminum plates, and the hardening accelerator "Loctite 7386" is coated on the other. Then, after the aluminum plate on which the hardening accelerator is coated, is exposed in the daylight in which the light ray of more than 400 nm is cut off by a filter, both are adhered together, and the peeling-off test is conducted. The result is shown in Table 5. Incidentally, the hardening condition is: 22° C., 24 hours, the film thickness of the adhesive agent is 50 μm, the quantity of light is 1.2 MW·cm⁻².

After the hardening accelerator coating,

| Daylight exposure time (minute) | Accumulated irradiation quantity (mJ · cm-2) | Adhesive agent hardening condition |
|---|---|---|
| 5 | 360 | ◎ |
| 10 | 720 | ◎ |
| 20 | 1440 | ○ |
| 30 | 2160 | X |
| 45 | 3240 | X |

Adhesive agent hardening condition:
◎: completely hardened
○: partially no-hardened, but can be used
X: completely no-hardened If can be seen from Table 5 that, in the case where the accumulated irradiation quantity of the light ray in which the light ray more than 400 nm is cut off, is not more than about 720 mJ·⁻², the adhesive agent is completely hardened, and in the case where it is about 1440 mJ·cm⁻², partially non-hardening phenomenon occurs, but the adhesive agent can be used, and when it is not smaller than about 2160 mJ·cm⁻², the adhesive agent is completely no-hardened.

According to the present invention, even when the temperature variation occurs, the optical deflection apparatus in which the mirror flatness of the polygon mirror and the balance characteristic can be improved, can be provided.

Further, in the optical deflection apparatus, even when the temperature variation occurs, the joint strength of the joint portion in which each part is jointed by the adhesive agent, can be prevented from being lowered.

Further, when the anaerobic adhesive agent is used together with the hardening accelerator including the amine organic compound and both surfaces are jointed together, the production method of the optical deflection apparatus and the adhering method thereof in which the disadvantage that the joint portion of the adhesive agent is easily peeled off, is prevented, and the joint strength can be prevented from being lowered, can be provided.

What is claimed is:

1. An optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein either the magnet and the rotating body or the bearing member and the rotating body are adhered together by an adhesive agent whose Young's modulus after hardening is not more than 100 N/mm$^2$.

2. The optical deflection apparatus of claim 1, wherein the rotating body has a polygon mirror and a flange member, and the magnet is adhered to the flange member.

3. The optical deflection apparatus of claim 1, wherein either the magnet and the rotating body or the bearing member and the rotating body are adhered together, using an anaerobic adhesive agent and a hardening accelerator including amine organic compound, in a state in which a accumulated irradiation quantity of the light ray of the wavelength of not more than 400 nm on the surface on which the hardening accelerator is coated, is not more than 1500 mJ/cm$^2$.

4. The optical deflection apparatus of claim 1, wherein the rotor unit is rotated in a state in which a predetermined gap between the bearing member of the rotor unit and a shaft of the base member is maintained.

5. An optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein a thermal expansion coefficient of the rotating body is not smaller than a thermal expansion coefficient of the magnet, and the magnet and the rotating body are adhered together by an adhesive agent whose a thermal expansion coefficient after hardening is not smaller than the thermal expansion coefficient of the rotating body.

6. The optical deflection apparatus of claim 5, wherein Young's modulus of the adhesive agent after hardening is not more than 100 N/mm$^2$.

7. The optical deflection apparatus of claim 5, wherein the magnet and the rotating body are adhered together, using an anaerobic adhesive agent and a hardening accelerator including amine organic compound, in a state in which a accumulated irradiation quantity of the light ray of the wavelength of not more than 400 nm on the surface on which the hardening accelerator is coated, is not more than 1500 mJ/cm$^2$.

8. The optical deflection apparatus of claim 5, wherein the rotor unit is rotated in a state in which a predetermined gap between the bearing member of the rotor unit and a shaft of the base member is maintained.

9. An optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein a thermal expansion coefficient of the rotating body is not smaller than a thermal expansion coefficient of the bearing member, and the bearing member and the rotating body are adhered together by an adhesive agent whose a thermal expansion coefficient after hardening is not smaller than the thermal expansion coefficient of the rotating body.

10. The optical deflection apparatus of claim 9, wherein Young's modulus of the adhesive agent after the hardening is not more than 100 N/mm$^2$.

11. The optical deflection apparatus of claim 9, wherein the magnet and the rotating body are adhered together by an adhesive agent whose a thermal expansion coefficient after hardening is not smaller than the thermal expansion coefficient of the rotating body.

12. The optical deflection apparatus of claim 11, wherein each of the adhesive agent for adhering the rotating body and the bearing member and the adhesive agent for adhering the rotating body and the magnet, has Young's modulus after the hardening being not more than 100 N/mm$^2$.

13. The optical deflection apparatus of claim 9, wherein the bearing member and the rotating body are adhered together, using an anaerobic adhesive agent and a hardening accelerator including amine organic compound, in a state in which a accumulated irradiation quantity of the light ray of the wavelength of not more than 400 nm on the surface on which the hardening accelerator is coated, is not more than 1500 mJ/cm$^2$.

14. A production method of an optical deflection apparatus comprising:
    (a) a base member;
    (b) a coil fixed to the base member; and
    (c) a rotor unit rotatable to the base member, having
       (1) a bearing member,
       (2) a rotating body provided on the bearing member, having reflection surfaces, and
       (3) a magnet provided on the rotating body in a position facing the coil,
       the production method comprising the step of:
          adhering either the magnet and the rotating body or the bearing member and the rotating body together, using an anaerobic adhesive agent and a hardening accelerator including amine organic compound, in a state in which a accumulated irradiation quantity of the light ray of the wavelength of not more than 400 nm on the surface on which the hardening accelerator is coated, is not more than 1500 mJ/cm$^2$.

15. An exposure device for use in an image forming apparatus comprising:
    a laser emitting device; and
    an optical deflection apparatus for deflecting a laser beam emitted from the laser emitting device, the optical deflection apparatus comprising:

(a) a base member;
(b) a coil fixed to the base member; and
(c) a rotor unit rotatable to the base member, having
   (1) a bearing member,
   (2) a rotating body provided on the bearing member, having reflection surfaces, and
   (3) a magnet provided on the rotating body in a position facing the coil,
      wherein either the magnet and the rotating body or the bearing member and the rotating body are adhered together by an adhesive agent whose Young's modulus after hardening is not more than 100 N/mm$^2$.

16. An exposure device for use in an image forming apparatus comprising:
   a laser emitting device; and
   an optical deflection apparatus for deflecting a laser beam emitted from the laser emitting device, the optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein a thermal expansion coefficient of the rotating body is not smaller than a thermal expansion coefficient of the magnet, and the magnet and the rotating body are adhered together by an adhesive agent whose a thermal expansion coefficient after hardening is not smaller than the thermal expansion coefficient of the rotating body.

17. The exposure device of claim 16, wherein Young's modulus of the adhesive agent after hardening is not more than 100 N/mm$^2$.

18. An exposure device for use in an image forming apparatus comprising:
   a laser emitting device; and
   an optical deflection apparatus for deflecting a laser beam emitted from the laser emitting device, the optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein a thermal expansion coefficient of the rotating body is not smaller than a thermal expansion coefficient of the magnet, and the bearing member and the rotating body are adhered together by an adhesive agent whose a thermal expansion coefficient after hardening is not smaller than the thermal expansion coefficient of the rotating body.

19. The exposure device of claim 18, wherein Young's modulus of the adhesive agent after hardening is not more than 100 N/mm$^2$.

20. The exposure device of claim 18, wherein a thermal expansion coefficient of the rotating body is not smaller than a thermal expansion coefficient of the magnet, and the magnet and the rotating body are adhered together by an adhesive agent whose a thermal expansion coefficient after hardening is not smaller than the thermal expansion coefficient of the rotating body.

21. The exposure device of claim 20, wherein each of the adhesive agent for adhering the rotating body and the bearing member and the adhesive agent for adhering the rotating body and the magnet, has Young's modulus after the hardening being not more than 100 N/mm$^2$.

22. An optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein each of the magnet, the rotating body and the bearing member is adhered together by an adhesive agent whose Young's modules after hardening is not more than 100 N/mm$^2$.

23. A production method of an optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
      the production method comprising the step of:
         adhering each of the magnet, the rotating body and the bearing member together, using an anaerobic adhesive agent and a hardening accelerator including amine organic compound, in a state in which a accumulated irradiation quantity of the light ray of the wavelength of not more than 400 nm on the surface on which the hardening accelerator is coated, is not more than 1500 mJ/cm$^2$.

24. An exposure device for use in an image forming apparatus comprising:
   a laser emitting device; and
   an optical deflection apparatus for deflecting a laser beam emitted from the laser emitting device, the optical deflection apparatus comprising:
   (a) a base member;
   (b) a coil fixed to the base member; and
   (c) a rotor unit rotatable to the base member, having
      (1) a bearing member,
      (2) a rotating body provided on the bearing member, having reflection surfaces, and
      (3) a magnet provided on the rotating body in a position facing the coil,
         wherein each of the magnet, the rotating body and the bearing member are adhered together by an adhesive agent whose Young's modulus after hardening is not more than 100 N/mm$^2$.

* * * * *